May 26, 1964 A. J. BROOK ETAL 3,134,725
CULTURE TUBE
Filed Oct. 24, 1961

INVENTORS
ABRAHAM JACOB BROOK
EDMUND FRANCIS WODARSKI
SIMON HOLDOWSKY
BY
ATTORNEY

United States Patent Office 3,134,725
Patented May 26, 1964

3,134,725
CULTURE TUBE
Abraham Jacob Brook, New Brunswick, Edmund Francis Wodarski, East Brunswick, and Simon Holdowsky, Highland Park, N.J., assignors to Olin Mathieson Chemical Corporation, New York, N.Y., a corporation of Virginia
Filed Oct. 24, 1961, Ser. No. 147,225
2 Claims. (Cl. 195—139)

This invention relates to an improved apparatus for use in the scientific laboratory. More particularly, the invention relates to an improved tube especially useful in sterility testing.

Bacteria, fungi and other microorganisms are frequently cultured in nutrient media contained in a cylindrical tube. As a measure of quality control, pharmaceutical products which must be sterile at the time of use are tested at particular stages for sterility. Sterility tests are highly exacting and require rigid control of conditions. See, for example, Pharmacopeia of the United States, 16th revision, pages 855-859 (1960).

While absence of contamination from extraneous sources is of concern in most instances of bacteriological culturing, it is of particular importance when sterility tests are conducted. It is important to be confident that the growth of organisms in the medium means the presence of contaminants in the material under test. The contaminated material is disposed of or subjected to further treatment to make it sterile. Therefore it represents an economic loss if the disposal or further processing is undertaken in the mistaken belief that the product is contaminated when in fact the growth in the nutrient medium apparently signifying lack of sterility comes from extraneous sources.

Normally the culturing of microorganisms or sterility testing is carried out in a conventional cylindrical tube with a rounded bottom and open at the top. Such tubes are covered with a loose fitting cap to permit the entry of air. They are subject to the intrusion of air currents bearing contaminating organisms.

It is therefore an object of this invention to produce an improved piece of laboratory equipment.

It is a special object of this invention to produce an improved tube for sterility testing.

It is an important object of this invention to provide a tube adapted particularly for sterility testing which permits the entry of some air yet which effects substantial exclusion of contaminating organisms from extraneous sources.

The invention, in general, comprises an open-mouthed cylindrical tube, closed at one end in conventional manner, containing in the open end a short, concentric, cylindrical tube insert sealed to the interior sidewall of the culture tube itself a short distance from the mouth. Preferably a short portion of the cylindrical insert extends outside the mouth of the tube. A loose fitting cap, i.e. one which does not make the tube airtight, is placed over the opening of the insert and extends partially into the annular space formed between the tube and the insert.

With the cap in place, a tortuous path for the entry of air into the interior portion of the tube is thus formed. In this manner the incidence of induced contamination, resulting from its introduction by means of air currents, is minimized and erroneous conclusions are substantially reduced.

A more detailed understanding of the structure of the tube of this invention may be obtained from the drawing which accompanies this specification.

Figures 1, 2:
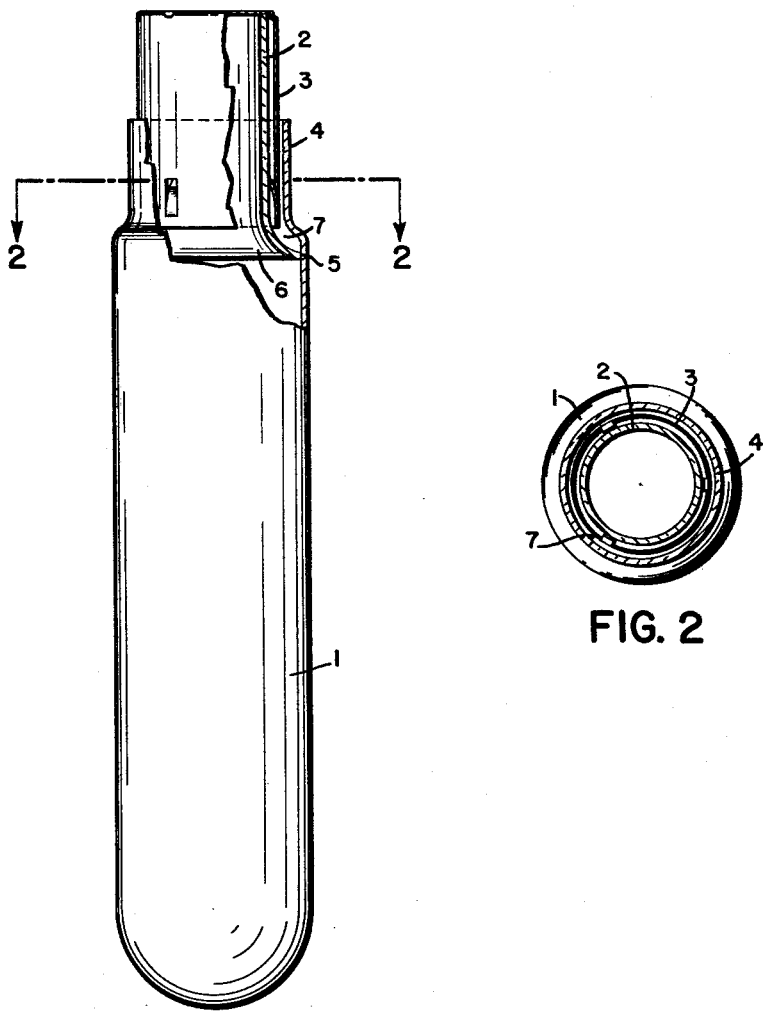
FIGURE 1 is a side view of the culture tube with cylindrical insert.
FIGURE 2 is a plan section along the line 2—2.

In FIGURE 1, the culture tube 1 is an elongated cylindrical tube with straight side walls. The side walls of the tube may curve inwardly near the open end thereof to form a neck 4 of slightly smaller diameter as an aid in forming the seal with the interior cylindrical tube section or insert 2. This constitutes a preferred form of this invention. The cylindrical insert 2 is flared at the interior end 6 which is sealed to the interior side wall of the culture tube at about the shoulder 5. Preferably the cylindrical insert extends for a short distance outside of the neck of the culture tube. The annular space 7, formed between the interior side wall of the culture tube and the exterior wall of the concentric cylindrical insert 2 is completely sealed off from the interior of the culture tube 1 by the flared end 6 so that there is no communication between the interior of the tube and the annular space.

A loose fitting cap 3, that is one which does not form a seal between it and the insert and does permit the passage of air or other gas, covers the open, exteriorly extending portion of the cylindrical insert and extends into the annular space 7. Thus a tortuous path for the entry of air is defined by the neck 4 of the culture tube, the annular space 7 and the space between the cap and the wall of the cylindrical insert.

The cap used to cover the opening of the cylindrical insert, which in itself does not form part of the invention, may take any form, e.g. a metal cylinder closed at one end. A preferred form of cap which is commercially available is a steel cylinder capped at one end. The closed end contains several indentations which set the cap off slightly from the edge of the tube. Spring clips near the open end of the cap also serve to set the cap off from the wall of the tube as well as prevent undesired movement or slippage of the cap. This is illustrated in FIGURE 2.

Access to the interior of the main body of the culture tube, e.g. for introduction and removal of the medium, the inoculant, etc., and for cleaning, is through the cylindrical insert. Normal handling and operation may be followed since the cylindrical insert merely narrows the neck opening by a small amount and permits straight through access when the cap is not in place.

The culture tubes of this invention are preferably constructed of a clear glass of the conventional type used for this type of apparatus. Glass facilitates inspection of the contents of the tube. It will be apparent, however, that other materials may be used for construction of this piece of laboratory apparatus without departing from the spirit of this invention.

The sizes of the insert and cap are relative to the size of the main culture tube. The relative proportions may, however, vary within rather broad limits. By way of illustration, a tube seven inches long and 1¼ inch inside diameter may contain an insert 1¾ inches long and ⅞ inch inside diameter extending about ¾ to 1 inch inside the tube. With this a cap about 1½ inches long and 1⅛ inch diameter may be used.

The culture tubes of this invention having the double mouth concentric opening is used in conventional manner for culturing microorganisms in nutrient media or for conducting sterility tests such as those described in the U.S. Pharmacopeia, supra.

What is claimed is:

1. A reuseable, open-mouthed, elongated cylindrical culture tube, closed at one end, a cylindrical concentric tubular insert smaller in diameter and length than the tube disposed within the open end of said tube exteriorly extending beyond the tube lip and providing direct, wide-mouth access through its interior to the interior of the tube, said insert having an enlarged interior end sealed to the interior side wall of the tube and defining an annular space between insert and neck of the tube closed from communication with the interior of the tube, and a loose fitting, slidably removable cap for said insert extending into said annular space which closes direct entry into the interior of the tube and, in cooperation with the insert and coextensive portion of the tube wall, provides a tortuous path for entry to the interior of the tube through said annular space and around the interior of said cap.

2. A reuseable, open-mouthed, elongated cylindrical culture tube, closed at one end, a cylindrical concentric tubular insert smaller in diameter and length than the tube disposed within the open end of said tube exteriorly extending beyond the tube lip and providing direct, wide-mouth access through its interior to the interior of the tube, said insert having an enlarged, flared interior end sealed to the interior side wall of a shoulder in the wall of the tube and defining an annular space between insert and neck of the tube closed by said sealed interior end from communication with the interior of the tube, and accepting a loose fitting, slidably removable cap for said insert which extends into said annular space and closes direct entry into the interior of the tube and by being spaced away from the glass walls and lips of tube and insert provides a tortuous, substantially restricted entry to the interior of the tube through said annular space.

References Cited in the file of this patent

UNITED STATES PATENTS

| | | |
|---|---|---|
| 752,335 | Foster | Feb. 16, 1904 |
| 826,261 | Miller | July 17, 1906 |
| 1,513,360 | Ablahadian | Oct. 28, 1924 |
| 1,616,274 | Mulford | Feb. 1, 1927 |
| 1,861,121 | Kapsenberg | May 31, 1932 |
| 2,098,918 | Hendrickson | Nov. 9, 1937 |
| 2,971,892 | Carski | Feb. 14, 1961 |